United States Patent [19]

Kaiser et al.

[11] 3,906,126
[45] Sept. 16, 1975

[54] CAN BODY

[75] Inventors: Edward William Kaiser, Arlington Heights; Kenneth Richard Rentmeester, Barrington, both of Ill.

[73] Assignee: American Can Company, Greenwich, Conn.

[22] Filed: May 10, 1973

[21] Appl. No.: 358,842

Related U.S. Application Data

[60] Division of Ser. No. 202,096, Nov. 26, 1971, Pat. No. 3,773,589, which is a continuation of Ser. No. 830,918, May 22, 1969, abandoned, which is a continuation-in-part of Ser. No. 491,211, Sept. 29, 1965, abandoned.

[52] U.S. Cl. ............... 428/36; 138/145; 138/170; 138/177; 220/62; 220/75; 220/83; 428/156; 428/201; 428/416; 428/420; 428/458; 428/474; 428/524

[51] Int. Cl.² ............... B65D 7/12; B32B 15/08; B32B 27/34; B32B 27/38

[58] Field of Search ...... 138/145, 170, 177; 220/62, 220/75, 83; 161/186, 227, 147, 116, 188, 214, 257

[56] References Cited
UNITED STATES PATENTS

| | | | |
|---|---|---|---|
| 2,867,592 | 1/1959 | Morris et al. | 156/330 X |
| 2,962,468 | 11/1960 | Groves | 161/186 X |
| 3,040,781 | 6/1962 | Reymann et al. | 138/145 |
| 3,334,057 | 8/1967 | Marks et al. | 156/330 X |
| 3,411,542 | 11/1968 | Walsh et al. | 138/170 |
| 3,703,434 | 11/1972 | Schaaf | 161/186 X |
| 3,737,355 | 6/1973 | Epstein et al. | 161/186 X |
| R27,748 | 9/1973 | Peerman et al. | 220/81 |

*Primary Examiner*—Harold Ansher
*Attorney, Agent, or Firm*—Robert P. Auber; Ernestine C. Bartlett; Ira S. Dorman

[57] ABSTRACT

A metal can body is formed with a longitudinally extending lap side seam which is securely bonded with a nylon type high strength organic adhesive. In order to provide a strong permanent bond in the side seam, the body is precoated with an epoxy type coating which adheres tenaciously to both the adhesive and to the metallic body surfaces.

3 Claims, 4 Drawing Figures

PATENTED SEP 16 1975
3,906,126
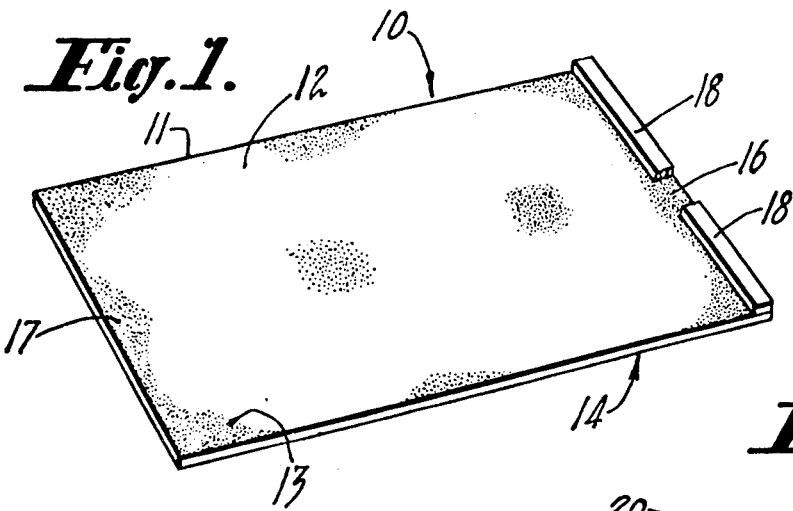
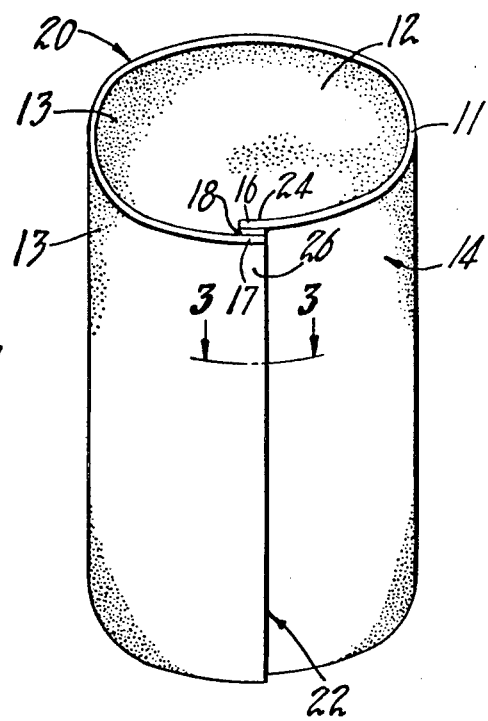
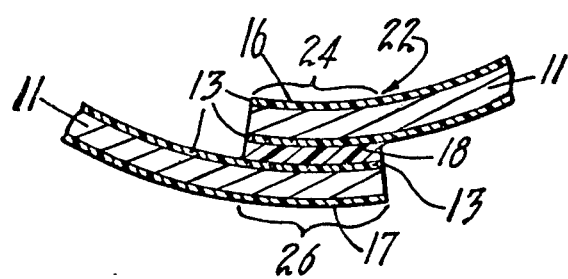
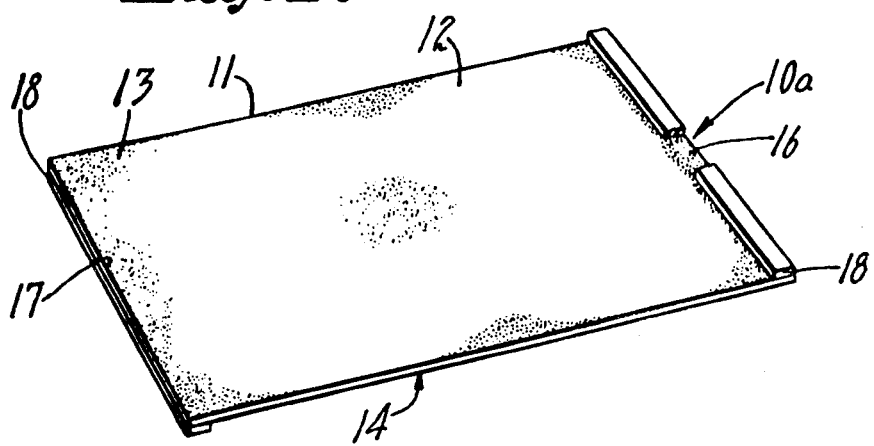

CAN BODY

This application is a division of co-pending application Ser. No. 202,096 filed Nov. 26, 1971, now U.S. Pat. No. 3,773,589 which was in turn a continuation of application Ser. No. 830,918 filed May 22, 1969, now abandoned, which was in turn a continuation-in-part of application Ser. No. 491,211, filed Sept. 29, 1965, now abandoned.

BACKGROUND OF THE INVENTION

Cemented, as opposed to soldered, side seams bodies are known in the art. Cans produced from such bodies have found a substantial degree of commercial success for the packaging of products which generate no substantial internal pressure, such as frozen citrus concentrate, household cleaners and polishes, and the like. One of the major selling features of such can bodies is that it is possible to provide printed decorations, as opposed to paper labels, completely around the external surface of the can body. However, such prior art cemented side seam bodies do not have a high degree of bursting strength, particularly when the can is subjected to conditions necessary to process certain products such as the sterilization cooking for fruits and vegetables, or pasteurization of beer.

The very high strength adhesives known to the art have not been heretofore successfully used in the manufacture of cemented side seam can bodies for any one of a number of reasons. Some of the major reasons are that although these adhesives have excellent cohesive strength they have been woefully deficient in their adhesion to a metal surface or even to the coatings applied to sheet metal for making can bodies. Another drawback is that these high strength adhesives require a relatively prolonged setting time in the order of minutes or even hours, which time periods are completely unsuitable for high speed can making operations where sufficient bonding strength to hold the can body together must be achieved within seconds or less. The present invention overcomes all of these disadvantages.

It is therefore an object of the present invention to provide a lap side seam can body having exceptionally high bursting or hoop strength.

Another object is to provide a lap side seam can body which maintains its high bursting or hoop strength even after it is subjected to prolonged conditions of moist heat.

Yet another object is to provide a lap side seam can body which can be made rapidly on high speed automatic equipment.

A further object is to provide a can body blank from which a high strength lap side seam can body can be made.

Yet a further object is to provide a coating composition for sheet metal from which a lap side seam can body is made, which coating adheres tenaciously to the sheet metal under widely diverse ambient conditions and to which a high strength adhesive adheres tenaciously under those same conditions.

Numerous other objects and advantages of the invention will be apparent as it is better understood from the following description, which, taken in connection with the accompanying drawings, discloses a preferred embodiment thereof.

SUMMARY OF THE INVENTION

The above objects are accomplished by providing a tubular sheet metal, lap side seam can body having as a coating, on at least the opposed surfaces of the longitudinal margins thereof included in the lap side seam, a baked organic coating containing a cured epoxide. Preferably this coating is a heat-cured reaction product, formed by applying and baking a coating composition made up of a polyvinyl acetal resin, a normally solid epoxide resin, a phenolaldehyde resin, and an acidic aliphatic amine phosphate, the opposed coated surfaces being bonded together with a linear superpolyamide adhesive. This can body is formed from a flat blank having its margins coated in the manner described and having the adhesive applied, before bonding of the lap seam, to the coating on at least one of these margins. The method and apparatus for the making of this can body blank is described in copending application Ser. No. 486,994 filed Sept. 13, 1965, in the names of Edward William Kaiser, Arnold Robert Rein, and Richard Otto Wahler, now U.S. Pat. No. 3,481,809. Thus, in carrying out the method in accordance with the present invention, the steps of forming the blank into tubular shape, applying the superpolyamide adhesive to the longitudinal margin areas, heating the adhesive, and pressing the opposed lap seam surfaces together between chilled supporting surfaces are effected automatically, less than about one second being required for heating the adhesive and pressing the lap seam surfaces together to form the bonded seam.

Referring to the drawing:

FIG. 1 is a perspective view of a can body blank of the instant invention;

FIG. 2 is a perspective view of a can body of the instant invention;

FIG. 3 is a fragmentary enlarged sectional view taken substantially along line 3—3 of FIG. 2; and FIG. 4 is a modified form of the can body blank shown in FIG. 1.

As the preferred or exemplified embodiment of the instant invention, FIG. 1 shows a substantially rectangular can body blank generally designated 10 having for the metal component thereof thin gage sheet metal 11 in the order of magnitude of ten thousandths of an inch. This sheet metal, which may be thicker or thinner than the numerical value given, may be aluminum or low carbon steel, with or without an external plating of aluminum, chromium, nickel or tin. Completely covering the opposed, extensive flat surfaces 12 and 14 is a particular organic coating composition 13 which will be defined more fully hereinafter. Tenaciously adhered to the coating 13 along the upper surface of one longitudinal margin 16 of the blank 10 is an organic cement or adhesive 18, which will also be defined more fully hereinafter. The adhesive 18 extends the full length of the margin 16 and inwardly from the edge of this margin, i.e. has a width of from 7/32 inch to 9/32 inch and preferably ¼ inch, and upwardly from the coated surface of this margin, i.e. has a thickness of from 0.003 inch to 0.006 inch and preferably about 0.005 inch.

The blank 10 is formed into an open ended tubular can body, generally designated 20 (FIG. 2), on a high speed, automatic, can body maker, for example of the type illustrated in the aforementioned U.S. Pat. No. 3,481,809, by wrapping the blank 10 around a mandrel, heating the adhesive 18 to a semi-fluid, tacky condition and pressing the coated lower surface of the opposite blank margin 17 into intimate contact with the tacky adhesive. Immediately thereafter the bonded side seam is chilled to set the adhesive and to secure the lapped margins together to form the can body 20 having a lap side seam generally designated 22, including an inner lap 24 (from the margin 16) and an outer lap 26 (from the margin 17). Bonding of the lapped margins is accomplished in less than one second, and preferably in about 10 milliseconds.

As best shown in FIG. 3, the adhesive 18 does not bond directly to the sheet metal 11 of the can body but rather to the opposed surfaces of the organic coating 13 included within the side seam 22. In other words, the high strength bond of the lap side seam 22 is a result of the tenacious adherence of the coating 13 to the sheet metal 11 and to the organic adhesive 18 interposed between the coated faces of the margins 16, 17.

As stated previously, the coating 13 extends over the entire flat surfaces 12 and 14 of the sheet metal 11 and as a result thereof over the entire inside and outside surface of the can body 20. However, it is to be understood that to form the high strength bond of the instant invention it is necessary only that the coating 13 be present on the inner surface of the outer lap 26 and on the outer surface of the inner lap 24; or, stated in another way, that the coating 13 be present on the opposed faces of the margins 16, 17 included within the lap seam 22. However, the coating 13 not only provides a highly adherent intermediate layer between the adhesive 18 and the sheet metal 11, it also provides a protective coating for the metal over its exposed surface. For this reason it is preferred that the coating 13 extend over the entire inside and outside surface of the can body 20.

The coating 13 also provides an adherent base upon which to apply printing or other decorating for the outside surface of the can body 20. This decoration (not shown) is most conveniently applied in the flat, i.e. to that surface of the blank 10 or of a larger sheet from which the blank is cut which will later form the outside surface of the can body. This decorative coating does not extend into the margin 16 to which the adhesive 18 is adhered, so as to insure that the adhesive 18 is bonded directly to the coating 13. However, when the blank is formed into the tubular can body 20, this gap in the decorative coating is taken up by the overlap in the lap side seam 22 to provide substantially full circumferential decoration on the external surface of the can body.

FIG. 4 shows the modified form of the can body blank generally designated 10A. The can body blank 10A is similar to can body blank 10 previously described in all respects except that both the upper surface of the margin 16 and the lower surface of the margin 17 have adhered thereto a strip of adhesive 18. In this manner when the blank is rolled into tubular configuration to form the can body 20 there will be an adhesive-to-adhesive seal in the lap side seam 22 rather than an adhesive-to-coating seal as in the preferred embodiment. The thickness of each strip of adhesive 18 on the blank margins is preferably less in the modified form shown in FIG. 4 than in the preferred embodiment of FIG. 1 so that, upon over-lapping and bonding the marginal edges, the adhesive thickness between the lapped margins will be substantially the same as or only slightly greater than in the preferred embodiment.

The coating 13, mentioned hereinbefore, consists essentially of, by weight, the heat reaction product of from 1 to 8 and preferably about 4 parts of a polyvinyl acetal resin; from 50 to 90 and preferably about 70 parts of a 1,2-epoxide resin; from 5 to 50 and preferably about 25 parts of a methylol phenol resin; and from 0.2 to 2.0 and preferably about 0.6 parts of an aliphatic amine phosphate acid salt. The coating 13 is applied as a solution or dispersion of the above described ingredients, before their inter-reaction, in a fugitive liquid. The solution method is preferable, and the particular liquids, whether solvents or dispersants, are not especially critical. It is necessary, however, that the liquid be volatile at baking temperatures which may be as low as 350°F or as high as 650°F. At the lower temperature a baking period of about 20 minutes may be required and at 650° a time of 15 seconds may suffice. For the preferred solvent solution, the solvent must also be compatible with all the ingredients in their useful concentrations, so that precipitation, stratification or other spearation does not occur. Due to the presence of vinyl polymers in the composition, only very small amounts of aliphatic hydrocarbons can be tolerated. Suitable solvents comprise aryl or aralkyl hydrocarbons blended with alcohols, kketones, ethers or esters and mixtures thereof. Alcohols, ketones, ethers and esters or mixtures thereof can be used without the aryl or aralkyl hydrocarbons. Solvent systems comprising a mixture of aryl or aralkyl hydrocarbons and alcohols yield solutions having optimum viscosity for application and for this reason are preferred.

Examples of the aromatic hydrocarbon solvents are xylene, toluene, and petroleum fractions having a high proportion of aromatic hydrocarbons and having a boiling range of about 230° to 415°F. Examples of suitable oxygen containing solvents are butanol, diacetone alcohol, isophorone, methyl isobutyl ketone, nitropropane, butyl Cellosolve, tetrahydrofuran, cyclohexanone, amyl acetate, methyl Cellosolve acetate, diisobutyl ketone and cyclohexanol.

The polyvinyl resins (identified generically as polyvinyl acetal resins) that are useful are polyvinyl formal, polyvinyl acetal, and polyvinyl butyral, each containing some free hydroxyl groups. The maximum useful polyvinyl alcohol content is about 22%. Mixtures of these polyvinyl resins can also be employed. The preferred resin is a polyvinyl acetal having a polyvinyl alcohol content of from about 8% to 21%, and specifically preferred in this class is polyvinyl butyral.

The 1,2-epoxide resin present in the coatings belongs to the class of complex polymeric epoxy-hydroxy ethers resulting from the catalyzed reaction of a polyhydric phenol with an excess of an epoxide, e.g. epihalohydrins and alkylene oxides, as described in U.S. Pat. Nos. 2,456,408 and 2,592,560. The principal product of this reaction is a resinous epoxy glyceryl polyether comprising epoxyglyceryl (glycidyl) radicals or hydroxyl substituted glyceryl radicals alternating with the divalent residue of the polyhydric phenol, which radicals are united in a chain through ether oxygen atoms. From this class of polymeric epoxy-hydroxy ethers only those that are solid at room temperature, about 65°F., having an epoxide equivalent, i.e. number of grams of resin containing one gram equivalent of epoxide, of about 425 to 6,000 and having a number average molecular weight of from 1,000 to 4,000 are operable. The 1,2-epoxide resin preferred for use in the instant invention is the glyceryl polyether of 4,4'-dihydroxy-diphenyl-dimethyl-methane, the latter being alternatively named 4,4'-isopropylidene-diphenol or bisphenol A, having an epoxide equivalent of from 2,000 to 2,500 and a number average molecular weight of about 3,000.

The methylol-phenol resin is a methylol phenyl ether in which the H of the hydroxyl group attached to the phenyl group is substituted by an alkyl, alkenyl, or cycloalkyl group, or by an aralkyl or aralkenyl group, as well as the halogenated derivatives thereof. These resins are A-stage methylol-phenol resins, i.e. soluble and fusible, and are disclosed and described in U.S. Pat. No. 2,579,330. The preferred resin from this class is 1-allyloxy-2,4,6-trimethylol benzene which may contain small amounts of the mono- and dimethylol phenyl allylether.

As the aminophosphate acid salt may be used the mono-, di-, or tri-amine salts of ortho, meta and pyrophosphoric acids. The amines are selected from the group consisting of primary, secondary and tertiary aliphatic amines and mixtures thereof containing 3 to 15 carbon atoms. The expression "acid salt" is meant to connote that one or more acidic hydrogen atoms, e.g. 3, from the phosphoric acid remain in the molecule of the salt. Phosphate acid salts found suitable include mono-(dibutylamine) pyrophosphate, -tetramethyl-butylamine metaphosphate, tertiaryoctylamine metaphosphate (1,1,3,3-tetrammethylbutylamine metaphosphate), laurylamine metaphosphate (dodecylamine metaphosphate), allylamine metaphosphate, triamylamine pyrophosphate (tripentylamine pyrophosphate), and dicyclohexylamine metaphosphate. In the amounts used in the instant coating composition these amine phosphate salts are soluble in the volatile organic liquid system of the coating composition.

After application of the fluid coating composition described immediately above and during the baking of the thus coated sheet described hereinbefore, the nonvolatile ingredients are inter-reacted and the volatile organic liquid is driven off so that upon completion of the baking operation and subsequent cooling the solid inert adherent coating 13 remains on the metal sheet 11. At the elevated temperature of the baking operation the amine phosphate salt provides a multiplicity of functions some of which are not completely understood. It is believed that at the elevated temperature, the salt breaks down into an acid phosphate moiety and an amine moiety. The acid phosphate moiety apparently treats the surface of the metal sheet 11 in some manner to make it more adherent to the coating 13 and to passify the surface to make it corrosion resistant. It also provides acid functionality to catalyze the polymerization of the phenol-aldehyde resin toward, if not to, its thermoset condition. The amine moiety reacts with the 1,2-epoxide resin to catalyze this resin further at least toward a thermoset condition. The polyvinyl acetal resin probably through its polyvinyl alcohol component enters into reaction possibly with the 1,2-epoxide resin to provide the finished coating with better flexibility, adhesion and moisture resistance.

A specific example of a fluid composition for application to the sheet metal 11 to provide the finished coating 13 is as follows:

| Ingredient | Parts by Weight |
| --- | --- |
| Epon 1007 | 70.0 |
| 1-allyloxy-2,4,6-trimethylol-benzene | 26.0 |
| polyvinyl butyral containing about 12% polyvinyl alcohol | 4.0 |
| mono(dibutylamine) pyrophosphate | 0.5 |
| toluene | 100.0 |
| butanol | 70.0 |

Epon 1007 set forth above is the trade name for a 1,2-epoxide resin meeting the definition of the preferred 1,2-epoxide resin. The first four ingredients were dissolved in the toluene and butanol through a homogeneous solution which was uniformly applied to one large flat surface of sheet aluminum. The thus coated sheet was passed into an oven and baked at a temperature of about 400°F. for 10 minutes and thereafter cooled to provide the coating 13.

In addition to the above described coating, other types of epoxy based coatings have also been found to be suitable for use as the coating 13 in promoting a tenacious bond within the side seam and for providing a protective coating for the surfaces of the metal body 11. One such other coating which may be thus substituted is an epoxy-urea-formaldehyde coating, wherein the epoxy component is substantially similar to the 1,2-epoxide resin hereinbefore described.

The linear superpolyamide adhesives useful in the instant invention are generally characterized by having recurring aliphatic amido groups separated by alkylene groups having at least two carbon atoms and having an intrinsic viscosity of at least 0.4. These superpolyamides and the definition of intrinsic viscosity are disclosed in U.S. Pat. No. 2,130,948. Among the superpolyamides which are useful in the present invention are polypentamethylene sebacamide, polyhexamethylene adipamide, polyhexamethylene sebacamide, polydecamethylene adipamide, polydecamethylene sebacamide, poly-m-phenylene sebacamide, 6-aminocaproic acid polymers, 7-amino-heptanoic acid polymers, 11-amino undecanoic acid polymers and 12-amino-stearic acid polymers, with poly-11 amino-undecanoic being preferred. It is believed that the tenacious bond between the epoxy coatings and these superpolyamide adhesives is produced as the result of a reaction product between the 1,2-epoxide resin and the adhesive.

It is thought that the invention and many of its attendant advantages will be understood from the foregoing description and it will be apparent that various changes may be made in the matter of ingredients, the identify and the proportions of the formulation, and that changes may be made in the form, construction and arrangement of the parts of the article without departing from the spirit and scope of the invention or sacrificing all of its material advantages, the form hereinbefore described being merely a preferred embodiment thereof.

We claim:

1. A tubular sheet metal can body having its opposed longitudinal edges overlapped to form a side seam, comprising:

an organic coating tenaciously adhered to at least one of the opposed surfaces of said sheet metal included within said lap side seam, said organic coating comprising the reaction product of 1. a polyvinyl acetal resin containing from 6% to 22% polyvinyl alcohol and selected from the group consisting of polyvinyl formal, polyvinyl acetal, polyvinyl butyral, and mixtures thereof,
2. a resinous glycidyl polyether having glyceryl groups united with the divalent residue of a polyhydric phenol through ether oxygen atoms, having terminal glycidyl groups providing an epoxide equivalent of from 425 to 6,000 and having a number average molecular weight of from 1,000 to 4,000,
3. an alkenyl ether of a polymethylol phenol, and
4. an amine phosphate acid addition salt selected from the group consisting of mono(dibutylamine) pyrophosphate, triethylamine metaphosphate, tertiary-octylamine metaphosphate, laurylamine metaphosphate, allylamine metaphosphate, triamylamine pyrophosphate, dicyclohexylamine metaphosphate, and mixtures thereof;

and a high-strength organic adhesive disposed within said lap side seam and tenaciously adhered to said organic coating to form a side seam bond which has a high bursting strength, said organic adhesive comprising a linear superpolyamide having an intrinsic viscosity of at least 0.4

2. The can body set forth in claim 1, wherein said organic coating is adhered to both of the opposed sheet metal surfaces included within said lap side seam, and said organic adhesive is disposed and adhered therebetween.

3. The can body set forth in claim 1, wherein the amine phosphate (4) is mono(dibutylamine) pyrophosphate.

* * * * *